US008915614B2

(12) United States Patent
Chen

(10) Patent No.: US 8,915,614 B2
(45) Date of Patent: Dec. 23, 2014

(54) LIGHT SOURCE MODULE USING LASERS AS LIGHT SOURCE

(71) Applicant: Hon Hai Precision Industry Co., Ltd., New Taipei (TW)

(72) Inventor: Po-Chou Chen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 37 days.

(21) Appl. No.: 13/931,506

(22) Filed: Jun. 28, 2013

(65) Prior Publication Data

US 2014/0211461 A1 Jul. 31, 2014

(30) Foreign Application Priority Data

Jan. 28, 2013 (TW) ............................. 102103220 A

(51) Int. Cl.
*G02B 27/20* (2006.01)
*F21V 5/02* (2006.01)
*F21Y 113/00* (2006.01)
*F21Y 101/02* (2006.01)

(52) U.S. Cl.
CPC ............ *F21V 5/02* (2013.01); *F21Y 2113/005* (2013.01); *F21Y 2101/025* (2013.01); *F21Y 2113/002* (2013.01)
USPC .......................................... 362/259; 362/231

(58) Field of Classification Search
USPC .................................................. 362/259, 231
See application file for complete search history.

(56) References Cited

U.S. PATENT DOCUMENTS 8,814,380 B2 * 8/2014 Zheng et al. .................. 362/231
8,833,944 B2 * 9/2014 Katou ............................. 353/31
2005/0248733 A1 * 11/2005 Sakata et al. .................... 353/94
2009/0033876 A1 * 2/2009 Shimaoka et al. .............. 353/31

* cited by examiner

*Primary Examiner* — Sean Gramling
(74) *Attorney, Agent, or Firm* — Novak Druce Connolly Bove + Quigg LLP

(57) ABSTRACT

A light source module includes a first triangular prism, a second triangular prism, a second laser source, and a third laser source. A first laser beam emitted from the first laser source and a second laser beam emitted from the second laser source are mixed to a first mixed laser beam by the first triangular prism. The third laser beam emitted from the third laser source and the first mixed laser beam emitted from the first triangular prism are mixed with a second mixed laser beam by the second triangular prism.

7 Claims, 2 Drawing Sheets

LIGHT SOURCE MODULE USING LASERS AS LIGHT SOURCE

BACKGROUND

1. Technical Field

The present disclosure relates to light source modules and, particularly, to a light source module using lasers as a light source.

2. Description of Related Art

Projectors generally include a light source, a color wheel, and a digital mirror device. Light rays emitting from the light source penetrate the color wheel and project on the digital mirror device. The digital mirror device reflects the light rays under control of image signals to modulate the light rays into optical images. However, at present, the light source is typically a halogen lamp or three light emitting diodes (LEDs), directionality of the light rays is less than satisfactory and off-axis light rays do not project on the digital mirror device and are not used, decreasing light usage efficiency.

Therefore, it is desirable to provide a light source module, which can overcome the limitations described.

DETAILED DESCRIPTION

Embodiments of the disclosure will be described with reference to the drawings.

Figure 1:
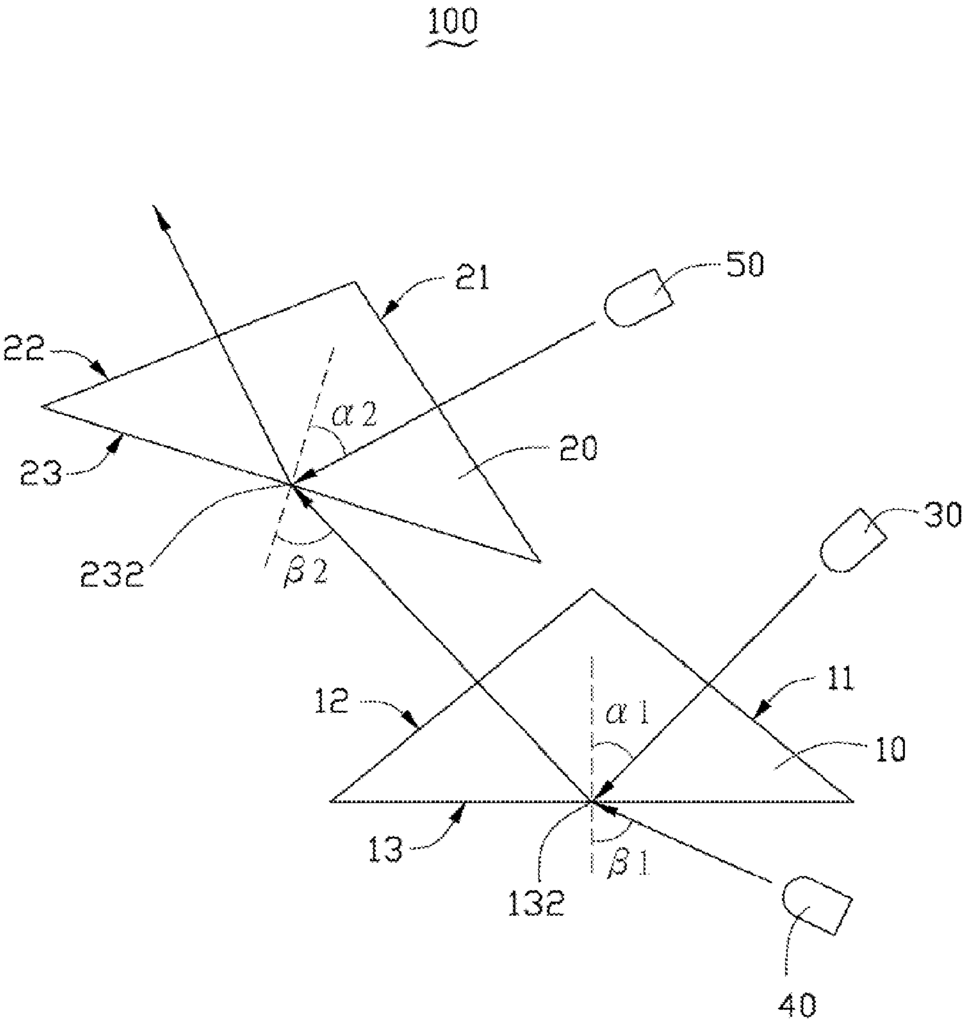
FIG. 1 is a schematic view of a light source module in accordance with a first exemplary embodiment.
Figure 2:
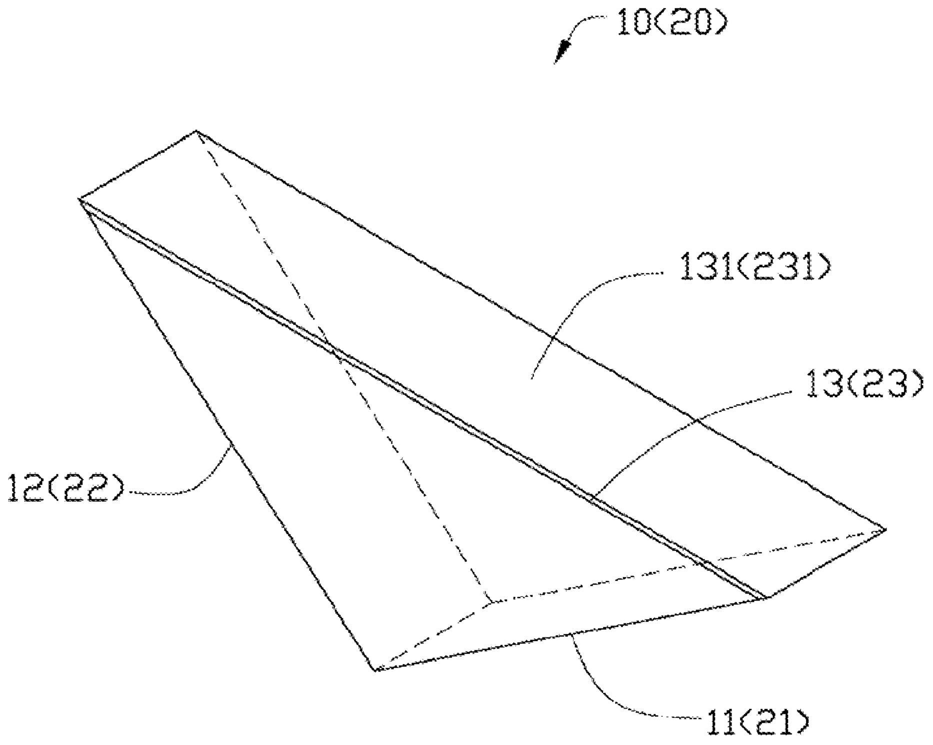
FIG. 2 is a schematic view of a first prism or a second prism of the light source module of FIG. 1.

FIGS. 1-2 show a light source module 100, according to an exemplary embodiment. The light source module 100 includes a first triangular prism 10, a second triangular prism 20, a first laser source 30, a second laser source 40, and a third laser source 50. A first laser beam emitted from the first laser source 30, a second laser beam emitted from the second laser source 40, and a third laser beam emitted from the third laser source 50 are mixed to a mixed laser.

The first triangular prism 10 is made of glass, and a refractive index of the first triangular prism 10 is represented by n1. The first triangular prism 10 includes a first incident surface 11, a first emergent surface 12, and a first bottom surface 13. The first emergent surface 12 connects the first incident surface 11. The first bottom surface 13 connects between the first incident surface 11 and the first emergent surface 12. A cross-section of the first triangular prism 10 is an isosceles triangle. The cross-sections of the first incident surface 11 and the first emergent surface 12 are two equal sides. The first triangular prism 10 includes a first film 131 coated on the first bottom surface 13, and the first film 131 reflects the first laser beam and transmits the second laser beam.

The second triangular prism 20 is made of glass, and a refractive index of the second triangular prism 20 is represented by n2. The second triangular prism 20 is adjacent to the first triangular prism 10. The second triangular prism 20 includes a second incident surface 21, a second emergent surface 22, and a second bottom surface 23. The second emergent surface 22 connects the second incident surface 21. The second bottom surface 23 connects between the second incident surface 21 and the second emergent surface 22. A cross-section of the second triangular prism 20 is an isosceles triangle. The cross-sections of the second incident surface 21 and the second emergent surface 22 are two equal sides. The second triangular prism 20 includes a second film 231 coated on the second bottom surface 23, and the second film 231 reflects the third laser beam and transmits the first and the second laser beams.

The first laser source 30 faces the first incident surface 11 of the first triangular prism 10. The first laser beam emitted from the first laser source 30 perpendicularly penetrates the first incident surface 11. The first laser beam penetrating the first incident surface 11 is reflected to the first emergent surface 12 by the first film 131 coated on the first bottom surface 13. The first laser beam reflected by the first film 131 is perpendicularly emitted from the first emergent surface 12. In the embodiment, the first laser beam is red light rays. An incidence angle of the first laser beam on the first film 131 is $\alpha_1$, according to Newton's law of reflection, a reflection angle of the first laser beam on the first film 131 is also $\alpha_1$. A point of the first film 131 reflecting the first laser beam is a first reflecting point 132.

The second laser source 40 faces the first bottom surface 13 of the first triangular prism 10. The second laser beam emitted from the second laser source 40 projects into the first triangular prism 10 from the first reflecting point 132 of the first film 131. An incidence angle of the second laser beam on the first film 131 is $\beta_1$, wherein Sin $\beta_1$=n1 Sin $\alpha_1$. A refraction angle of the second laser beam on the first film 131 is equal to the reflection angle of the first laser beam on the first film 131. Therefore the first laser beam reflected by the first film 131 and the second laser beam refracted by the first film 131 perpendicularly emit from a same point of the first emergence surface 12. The first laser beam and the second laser beam are mixed to a first mixed laser beam. In the embodiment, the second laser beam is green light rays.

The third laser source 50 faces the second incident surface 21 of the second triangular prism 20. The third laser beam emitted from the third laser source 50 perpendicularly penetrates the second incident surface 21. The third laser beam penetrating the second incident surface 21 is reflected to the second emergent surface 22 by the second film 231 coated on the second bottom surface 23. The third laser beam reflected by the second film 231 is perpendicularly emitted from the second emergent surface 22. In the embodiment, the third laser beam is blue light rays. An incidence angle of the third laser beam on the second film 231 is $\alpha_2$, according to Newton's law of reflection, a reflection angle of the third laser beam on the second film 231 is also $\alpha_2$. A point of the second film 231 reflecting the third laser beam is a second reflecting point 232.

In assembly, the second triangular prism 20 is positioned at a side of the first triangular prism 10. The second bottom surface 23 faces the first emergence surface 12. The first mixed laser beam emitted from the first triangular prism 10 projects into the second triangular prism 20 from the second reflecting point 232 of the second film 231. An incidence angle of the first mixed laser beam on the second film 231 is $\beta_2$, wherein Sin $\beta_2$=n2 Sin $\alpha_2$. A refraction angle of the first mixed laser beam on the second film 231 is equal to the reflection angle of the third laser beam on the second film 231. Therefore the third laser beam reflected by the second film 231 and the first mixed laser beam refracted by the second film 231 perpendicularly emit from a same point of the second emergence surface 22. The second laser beam and the first mixed laser beam are mixed to a second mixed laser beam. The second mixed laser beam is a white laser beam.

In use, the first triangular prism 10 reflects the first laser beam emitted from the first laser source 30, and the first triangular prism 10 refracts the second laser beam emitted from the second laser source 40. The first laser beam and the second laser beam are mixed with the first mixed laser beam by the first triangular prism 10. The first mixed laser beam emits from the first emergence surface 12. The third laser beam emitted from third laser source 50 is reflected by the second triangular prism 20, and the first mixed laser beam emitted from the first triangular prism 10 is refracted by the second triangular prism 20. The third laser beam and the first mixed laser beam are mixed into the second mixed laser beam by the second triangular prism 20. The second mixed laser beam emits from the second emergence surface 22.

As the light source module 100 using the lasers as the light source, the collimation of the light rays emitted from the light source is ensured. The first triangular prism 10 and the second triangular prism 20 mix the three laser beams, therefore the mixing accuracy of light source module 100 is increased.

Particular embodiments are shown and are described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A light source module, comprising:

a first triangular prism comprising a first incidence surface, a first emergence surface connected to the first incidence surface, and a first bottom surface connected to the first incidence surface and the first emergence surface, the first triangular prism further comprising a first film coated on the first bottom surface;

a second triangular prism comprising a second incidence surface, a second emergence surface connected to the second incidence surface, a second bottom surface connected to the second incidence surface and the second emergence surface, and a second film coated on the second bottom surface; the second triangular prism positioned at a side of the first triangular prism, and the second bottom surface facing the first emergence surface;

a first laser source facing the first incidence surface and emitting a first laser beam into the first triangular prism from the first incidence surface;

a second laser source facing the first bottom surface and emitting a second laser beam into the first triangular prism from the first bottom surface; and a third laser source facing the second incidence surface and emitting a third laser beam into the second triangular prism from the second incidence surface;

wherein the first film reflects the first laser beam and refracts the second laser beam, the first laser beam and the second laser beam are mixed into a first mixed laser beam on the first film by the first triangular prism, the first mixed laser beam is emitted from the first emergence surface to the second film, the second film reflects the third laser beam and refracts the first mixed laser beam; the third laser beam and the first mixed laser beam are mixed into a second mixed laser beam on the second film by the second triangular prism, the second mixed laser beam is emitted from the second emergence surface.

2. The light source module of claim 1, wherein the light source module satisfies the formulas: $\sin\beta_1 = n1 \sin\alpha_1$, $\alpha_1$ is an incidence angle of the first laser beam on the first film, $\beta_1$ is an incidence angle of the second laser beam on the first film, and n1 is a refractive index of the first triangular prism.

3. The light source module of claim 2, wherein the light source module satisfies the formulas: $\sin\beta_2 = n2 \sin\alpha_2$, $\alpha_2$ is an incidence angle of the third laser beam on the second film, $\beta_2$ is an incidence angle of the first mixed laser beam on the second film, and n2 is a refractive index of the second triangular prism.

4. The light source module of claim 1, wherein cross-sections of the first triangular prism and the second triangular prism are two isosceles triangles, cross-sections of the first incident surface and the first emergent surface are two equal sides, and cross-sections of the second incident surface and the second emergent surface are two equal sides.

5. The light source module of claim 1, wherein the first laser beam emitted from the first laser source perpendicularly penetrates the first incident surface.

6. The light source module of claim 5, wherein the third laser beam emitted from the third laser source perpendicularly penetrates the second incident surface.

7. The light source module of claim 1, wherein the first laser beam is a red light ray, the second laser beam is a green light ray, and the third laser beam is a blue light ray.

* * * * *